(12) United States Patent
Hilzinger et al.

(10) Patent No.: US 6,806,602 B2
(45) Date of Patent: Oct. 19, 2004

(54) ELECTROMECHANICAL WHEEL BRAKE DEVICE

(75) Inventors: Juergen Hilzinger, Leonberg (DE); Frank Schumann, Boennigheim (DE); Georg Blosch, Murr (DE); Guenter Kastinger, Gaggenau-Sulzbach (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/239,510

(22) PCT Filed: Dec. 9, 2000

(86) PCT No.: PCT/DE00/04378

§ 371 (c)(1),
(2), (4) Date: Feb. 10, 2003

(87) PCT Pub. No.: WO01/70552

PCT Pub. Date: Sep. 27, 2001

(65) Prior Publication Data

US 2004/0036370 A1 Feb. 26, 2004

(30) Foreign Application Priority Data

Mar. 22, 2002 (DE) .......................................... 100 14 226

(51) Int. Cl.[7] ................................................ H02K 7/02
(52) U.S. Cl. ........................... 310/77; 310/93; 310/216; 310/254; 188/162
(58) Field of Search .......................... 310/75 R, 76–78, 310/92, 93, 96–99, 12–37, 118, 123, 216–218, 254, 258, 259; 188/156–159, 161, 162

(56) References Cited

U.S. PATENT DOCUMENTS

| | | | | |
|---|---|---|---|---|
| 1,954,809 A | * | 4/1934 | Fraser | 310/93 |
| 2,774,895 A | * | 12/1956 | Zuckermann | 310/93 |
| 2,951,956 A | * | 9/1960 | Fehr | 310/93 |
| 3,044,593 A | * | 7/1962 | Gordon et al. | 192/84.91 |
| 3,680,671 A | * | 8/1972 | Hendershot et al. | 192/21.5 |
| 4,355,249 A | * | 10/1982 | Kenwell | 310/49 R |
| 5,023,499 A | * | 6/1991 | Kuwahara | 310/105 |
| 5,543,674 A | * | 8/1996 | Koehler | 310/164 |
| 5,949,168 A | * | 9/1999 | Dieckmann et al. | 310/75 R |
| 6,657,329 B2 | * | 12/2003 | Kastinger et al. | 310/49 R |

FOREIGN PATENT DOCUMENTS

| | | | | |
|---|---|---|---|---|
| EP | 0 557 123 A | * | 8/1993 | |
| EP | WO 96 03301 A | * | 2/1996 | |
| GB | 2 115 227 A | * | 9/1983 | |
| JP | 58 083576 A | * | 8/1983 | |

* cited by examiner

Primary Examiner—Dang Le
(74) Attorney, Agent, or Firm—Ronald E. Greigg

(57) ABSTRACT

The invention relates to an electromechanical wheel brake device, with an electric motor that can press a frictional brake lining against a brake body (brake disk) by a reduction gear (planetary gear) and a rotation/translation conversion gear (ball screw). The invention proposes embodying the electric motor as a transverse flux motor with three phase windings; each phrase winding has a circular, annular excitation winding that is disposed inside U-shaped yokes, which are distributed over the circumference of the excitation winding. This embodiment of the electric motor permits a compact design of the electric motor in an annular, hollow shaft design so that the reduction gear and the rotation/translation conversion gear can be disposed at least partially inside the electric motor.

10 Claims, 5 Drawing Sheets

ELECTROMECHANICAL WHEEL BRAKE DEVICE

CROSS-REFERENCE TO RELATED APPLICATIONS

This application is a 35 USC 371 application of PCT/DE 00/04378 filed on Dec. 9, 2000.

BACKGROUND OF THE INVENTION

1. Field of the Invention

The invention relates to an improved electromechanical wheel brake actuating device.

2. Description of the Prior Art

A wheel brake device of the type with which this invention is concerned has been disclosed by WO 96/03301. The known wheel brake device has an electric motor with an annular rotor, which can rotatingly drive a nut of a rotation/translation conversion gear embodied as a helical gear. The rotation/translation conversion gear converts the rotatory drive motion of the electric motor into a translatory motion so that a frictional brake lining of the wheel brake device can be pressed against a rotating brake body in order to generate a braking force or a braking moment. In order to release the wheel brake device, the frictional brake lining can be lifted up from the brake body by rotating the electric motor in the opposite direction. The known wheel brake device is embodied as a disk brake, the brake body is a brake disk non-rotatably connected to a vehicle wheel. In principle, the wheel brake device can also be used for other kinds of brake such as a drum brake.

SUMMARY OF THE INVENTION

In the wheel brake device according to the invention, the electric motor is embodied as a so-called transverse flux motor with an annular rotor. In contrast to conventional electric motors, which have a separate excitation coil for each pole, the transverse flux motor according to the invention has only one excitation winding per phase winding. The excitation winding is annular and encompasses an imaginary motor axis. In order to produce magnetic poles, the stator has yokes, which are distributed over the circumference of the excitation winding and can be magnetized by supplying current to the excitation winding. The yokes are preferably distributed equidistantly over the circumference, but this is not absolutely necessary. The supply of current to the excitation winding produces magnetic fields in the yokes. The annular excitation winding with the yokes distributed over its circumference will be referred to below as the excitation device of the transverse flux motor according to the invention. The excitation device preferably constitutes a stator of the transverse flux motor since this makes it easier to supply current.

In addition, the transverse flux motor of the wheel brake device according to the invention has a number of poles, which preferably corresponds to the number of yokes. The poles can be moved together in relation to the excitation device, on a circular path in the circumference direction of the yokes. If the excitation device constitutes the stator of the transverse flux motor, then the poles constitute its rotor, i.e. they are supported so that they can rotate together on a circular path around the imaginary motor axis. In order to produce a rotary motion, current is supplied to the excitation winding, i.e. the yokes are magnetized and magnetically attract the poles. The poles are pulled toward the yokes until the poles and yokes are aligned with one another. In order to produce the rotating motion, the excitation winding is supplied with current when the poles are offset in the circumference direction from the yokes. The poles move toward the yokes, i.e. the rotor rotates, until the poles and yokes are aligned with one another. Then the supply of current to the excitation winding is interrupted. In order to produce a more uniform concentric running of the transverse flux motor and a torque in every rotation position of the rotor, the transverse flux motor is preferably provided with three or more phase windings; each phase winding has an excitation device and associated poles (claim 3). This also assures that the transverse flux motor can start in every rotation position of its rotor and can start in the desired rotation direction. The supply of current to the excitation windings of the transverse flux motor of the electromechanical wheel brake device according to the invention is controlled electronically. In an embodiment of the transverse flux motor with permanent magnets, two phase windings are sufficient (claim 4). Such an embodiment of the invention has the advantage of a higher power density.

The wheel brake device according to the invention has the advantage that its electric motor requires only one excitation winding per phase winding instead of the usual one coil per pole required in conventional electric motors. Since the winding of coils and their attachment to the poles and yokes is expensive, this reduces the effort and cost involved in manufacturing. Another advantage of the wheel brake device according to the invention is that permanent magnets for its transverse flux motor can be eliminated, which can further reduce the effort and cost involved in manufacturing. Another advantage of the transverse flux motor is increased motor dynamics since it can easily be manufactured with a large number of poles, depending on how it is designed. An increase in the number of poles does not change the number of windings/coils. An increase in the number of poles therefore does not increase the manufacturing costs or only increases them slightly; the problem of not being able to accommodate or mount a large number of coils does not occur. Other advantages include an improvement in the efficiency, a volume reduction, and an increase in the power density. In addition, depending on how it is designed, the transverse flux motor is suitable for an annular design, as a result of which the rotation/translation conversion gear and a reduction gear possibly connected between the electric motor and the rotation/translation conversion gear can be accommodated in a cavity inside the annular transverse flux motor. In addition, situating the electric motor in an annular fashion around the gear produces a large lever arm and therefore a high driving torque of the electric motor.

BRIEF DESCRIPTION OF THE DRAWINGS

The invention will be explained in detail below in conjunction with exemplary embodiments shown in the drawings, in which.

DESCRIPTION OF THE PREFERRED EMBODIMENTS

Figure 1:
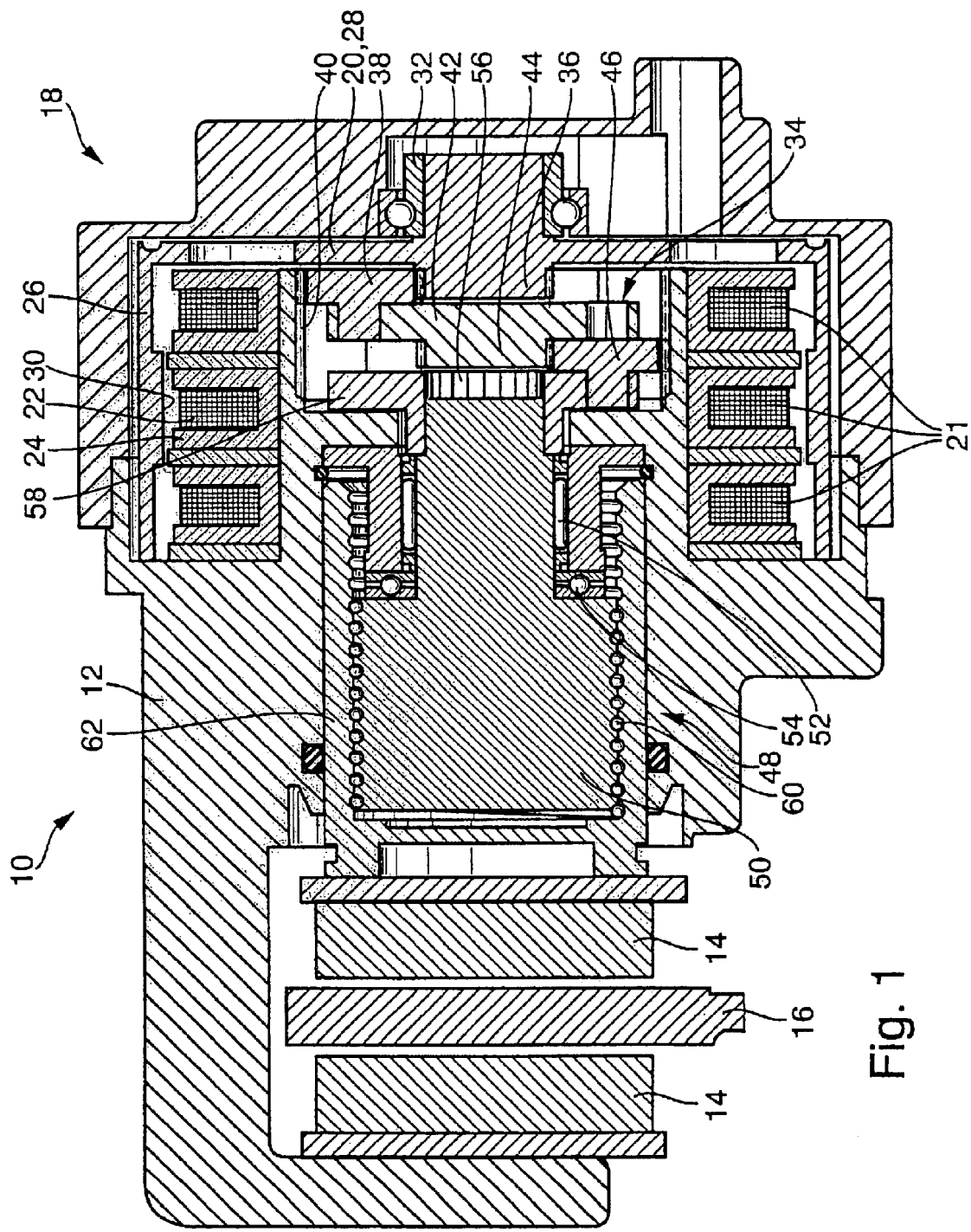
FIG. 1 shows an axial section through an electromechanical wheel brake device according to the invention, with a transverse flux motor in an external rotor design.

The electromechanical wheel brake device 10 according to the embodiment of the invention shown in FIG. 1 is illustrated as a disk brake device. It has a caliper 12 in which two frictional brake linings 14 are mounted, between which a brake disk 16 is supported so that it can rotate and is non-rotatably connected to a vehicle wheel, not shown. In order to generate a braking force or a braking moment, the frictional brake lining 14 shown on the right in the drawing is pressed against one side of the brake disk 16. A reaction force of the compressive force of the one frictional brake lining 14 shifts the caliper 12, which is embodied as a floating caliper, to one side in an intrinsically known fashion (toward the right in the drawing), so that the other frictional brake lining 14 is also pressed against the other side of the brake disk 16 and therefore a braking force is exerted on the brake disk 16 by the two frictional brake linings 14.

The wheel brake device 10 has an electric motor 18 to actuate it, which is embodied according to the invention as a transverse flux motor 18 and in the exemplary embodiment shown in FIG. 1, is embodied as a so-called external rotor motor. The electric motor 18 is annular in design, which can also be referred to as a hollow shaft design. A rotor 20 of the electric motor 18 is embodied as tubular or cup-shaped. The electric motor 18 of the wheel brake device 10, which is embodied as a transverse flux motor 18, has three phase windings 21, which are disposed next to one another in the axial direction, encompassing a brake caliper housing. The design and function of the transverse flux motor 18 will be explained below in conjunction with FIG. 2, which schematically depicts a phase winding of the transverse flux motor 18. Each phase winding of the transverse flux motor 18 has a circular excitation coil 22, which coaxially encompasses an imaginary motor axis of the transverse flux motor. The excitation winding 22 is inserted into U-shaped yokes 24, which are distributed equidistantly over the circumference of the excitation winding 22. For example, the transverse flux motor 18 has 12 yokes 24. The U-shaped yokes 24 are open toward the outside in the external rotor motor shown in FIG. 1. The yokes 24 and the excitation winding 22 disposed inside the yokes 24 constitute an excitation device 22, 24 of the transverse flux motor 18, which in the exemplary embodiment shown, simultaneously constitutes a stator of the transverse flux motor 18.

The rotor 20 of the transverse flux motor 18 is embodied as cup-shaped; it has a circumference wall 26, which is of one piece with an end wall 28. An inside surface of the circumference wall 26 of the rotor 20 is provided with a kind of denticulation that constitutes inward protruding poles 30. The rotor 26 has the same number of poles 30 as the stator 22, 24 has yokes 24; the poles 30 are spaced apart from each other by the same angular interval in the circumference direction as the yokes 24.

Figure 2:
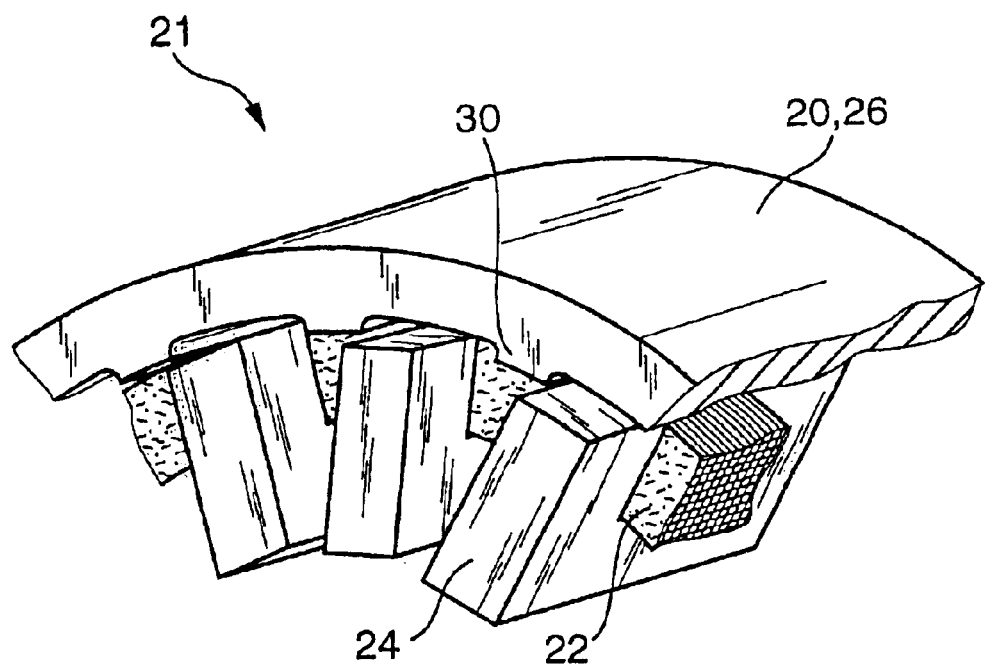
FIG. 2 schematically depicts a rotor/stator device of the transverse flux motor from FIG. 1.

If the pole pieces 30 of the rotor 26 are disposed in a position that is offset from the yokes 24 of the stator 22, 24, as shown in FIG. 2, then when the excitation winding disposed inside the yokes 24 is supplied with current, they are pulled by magnetic force toward the yokes 24, which exerts a torque on the rotor 20 of the transverse flux motor 18 and sets it into rotation. The torque is exerted on the rotor 20 until the poles 30 and the yokes 24 are congruently aligned with one another. In this rotation position of the rotor 20, the supply of current to the excitation winding 22 of this phase winding of the transverse flux motor 18 is switched off and the excitation winding 22 of the next phase winding is supplied with current. The next phase winding is the one in which the angular offset between the poles 30 and the yokes 24 is smaller in the rotation direction of the rotor 26. As a result, the rotor 26 is rotated further until the poles 30 and the yokes 24 of the next phase winding are congruently aligned with one another, whereupon the supply of current to the excitation winding 22 of this phase winding is also switched off and the excitation winding 22 of the third phase winding is supplied with current. A continuous, successive supply of current to the excitation windings 22 of the three phase windings of the transverse flux motor 18 sets its rotor into rotation and keeps it rotating. In order to turn the transverse flux motor 18 in the opposite direction, the sequence of the supply of current to the excitation windings 22 is reversed. Since in one phase winding of the transverse flux motor 18, the poles 30 have an angular offset in relation to the yokes 24 in one circumference direction and the poles 30 of another phase winding have an offset in relation to the yokes 24 of this other phase winding in the opposite circumference direction, the transverse flux motor 18 can start in every rotation position of its rotor 20 and can start in the desired rotation direction.

Either the poles 30 or the yokes 24 of the three phase windings of the transverse flux motor 18 are offset from one another in the circumference direction, preferably by ⅓ of their spacing in the circumference direction, i.e. the three phase windings of the transverse flux motor 18 have a phase offset of ⅓ the angular interval of their poles 30 and yokes 24 from one another in the circumference direction.

The supply of current to the excitation windings 22 is controlled electronically as a function of the angular position of the rotor 26 in relation to the stator 22, 24. A control of the supply of current to the excitation windings 22 is performed by means of a radial sensor bearing 32, which supports the rotor 20 of the transverse flux motor 18 so that it can rotate in the caliper 12. Sensor bearings 32 of this kind are intrinsically known and therefore need not be explained in detail since they are not the actual subject of the invention.

The three phase windings of the transverse flux motor 18 are disposed next to one another in the axial direction on a housing of the brake caliper 12. The excitation winding 22 and yokes 24 that constitute the stator are permanently affixed to an outside of the housing of the brake caliper 12 and are enclosed by the circumference wall 26 of the rotor 20, separated from it by an air gap.

The wheel brake device 10 according to the invention has a reduction gear 34, which is accommodated inside a cavity of the annularly embodied transverse flux motor 18. The reduction gear 34 in the exemplary embodiment of the invention shown is embodied as a two-stage planetary gear 34. A first stage of the planetary gear 34 has a sun wheel 36, which is non-rotatably connected to the end wall 28 of the rotor 20 and meshes with three planet wheels 38, which in turn mesh with an internal gearing 40 that is provided on the inside of a cylindrical cavity in the brake caliper 12. The internal gearing 40 constitutes a fixed ring gear 40 of the planetary gear 34.

The planet carrier 42 of the first stage of the planetary gear 34 is non-rotatably connected to a sun wheel 44 of the second stage of the planetary gear 34 and this sun wheel 44 meshes with planet wheels 46 of the second stage of the planetary gear 34. The planet wheels 46 of the second stage of the planetary gear 34 mesh with the internal gearing 40 of the brake caliper 12, which also constitutes a fixed ring gear of the second stage of the planetary gear 34.

In order to convert the rotational motion of the transverse flux motor 18, which is reduced by the planetary gear 34, into a translational motion for pressing the fractional brake linings 14 against the brake disk 16, the wheel brake device 10 according to the invention has a helical gear 48, which in the exemplary embodiment of the invention that is depicted and described here, is embodied as a ball screw 48. The rotation/translation conversion gear 48 is disposed partially inside the cavity of the annularly embodied transverse flux motor 18, which by and large results in a compact design of the wheel brake device 10. The rotation/translation conversion gear 48, which is embodied as a ball screw 48, has a spindle 50, which is supported with a radial needle bearing 52 so that it can rotate in the brake caliper 12 and is supported axially in relation to the brake caliper 12 by means of an axial ball bearing 54. A serrated connection 56 serves to connect the spindle 50 in a non-rotating fashion to a planet carrier 58 of the second stage of the planetary gear 34. The spindle 50 of the ball screw 48 engages by means of balls 60 with a nut 62 of the ball screw 48. One of the two frictional brake linings 14 is disposed on an end of the nut 62 oriented away from the planetary gear 34. By means of the planetary gear 34, the transverse flux motor 18 can drive the spindle 50 of the ball screw to rotate and the nut 62 of the ball screw 48 moves so that the frictional brake linings 14 can be pressed against the brake disk 16. The frictional brake linings 14 can be lifted up again from the brake disk 16 by rotating the transverse flux motor 18 in the opposite direction.

DESCRIPTION OF THE SECOND EXEMPLARY EMBODIMENT

Figure 3:
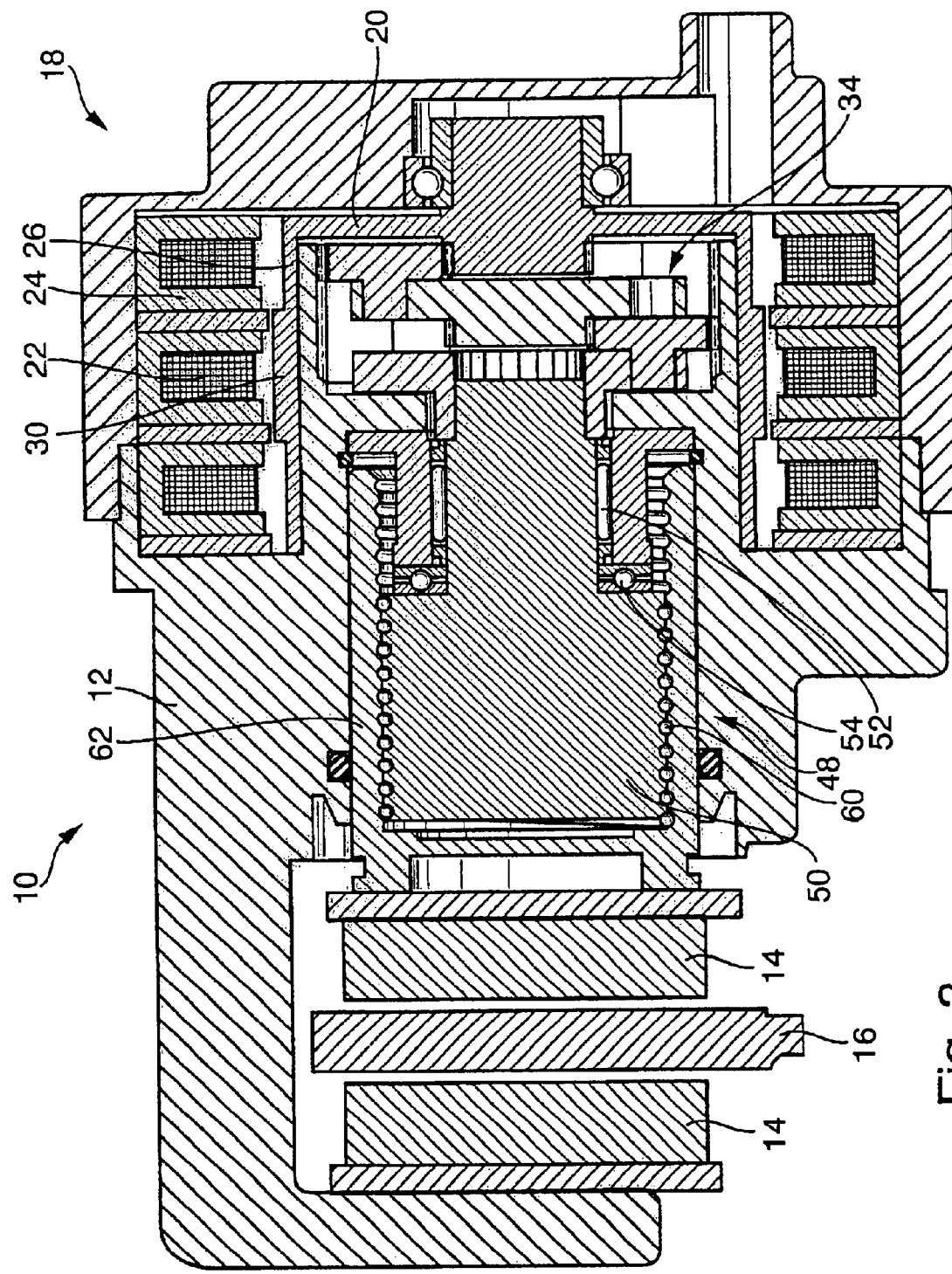
FIG. 3 shows a modified embodiment of the invention, with an internal rotor transverse flux motor.

In order to avoid repetition, only to differences between the electromechanical wheel brake device 10 according to the invention shown in FIG. 3 and the wheel brake device 10 shown in FIG. 1 will be explained. Otherwise, please refer to the explanations made in conjunction with FIG. 1. Parts, which are the same, are provided with the same reference numerals. In the wheel brake device 10 shown in FIG. 3, the transverse flux motor 18 is embodied differently than in FIG. 1. The transverse flux motor 18 in FIG. 3 is likewise embodied as a hollow shaft motor, but is designed as a so-called internal rotor motor. In the transverse flux motor 18 shown in FIG. 3, the excitation device 22, 24 with the excitation winding 22 and the U-shaped yokes 24 is disposed outside the likewise cup-shaped rotor 20. The U-shaped yokes 24 are therefore placed onto the excitation winding 22 from the outside, the opening of the yokes 24 points radially inward toward the cylindrical circumference wall 22 of the rotor 20. The denticulation of the rotor 20 that constitutes the poles 30 is disposed on the outside of the circumference wall 26. With the exception of the excitation device 22, 24, which is disposed on an outside of the cup-shaped rotor 20 and simultaneously constitutes the stator of the transverse flux motor 18, and a therefore smaller diameter of the rotor 20, the transverse flux motor 18 from FIG. 3 has the same design and functions in the same manner as the transverse flux motor 18 that is shown in FIG. 1 and explained above. The remaining design of the wheel brake device 10 from FIG. 3, with the two-stage planetary gear 34 and the rotation/translation conversion gear 48 embodied as a ball screw 48, corresponds to that of the one in FIG. 1 and functions in the same way.

Description of the Third and Fourth Preferred Embodiments of the Invention

Figure 5:
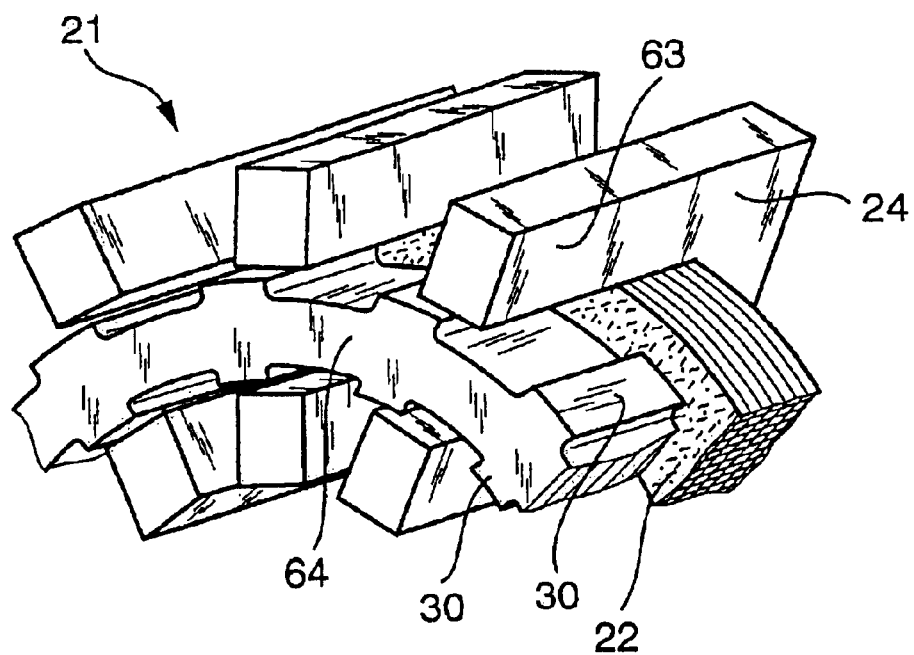
FIG. 5 schematically depicts a rotor/stator device of the transverse flux motor from FIG. 4.
Figure 4:
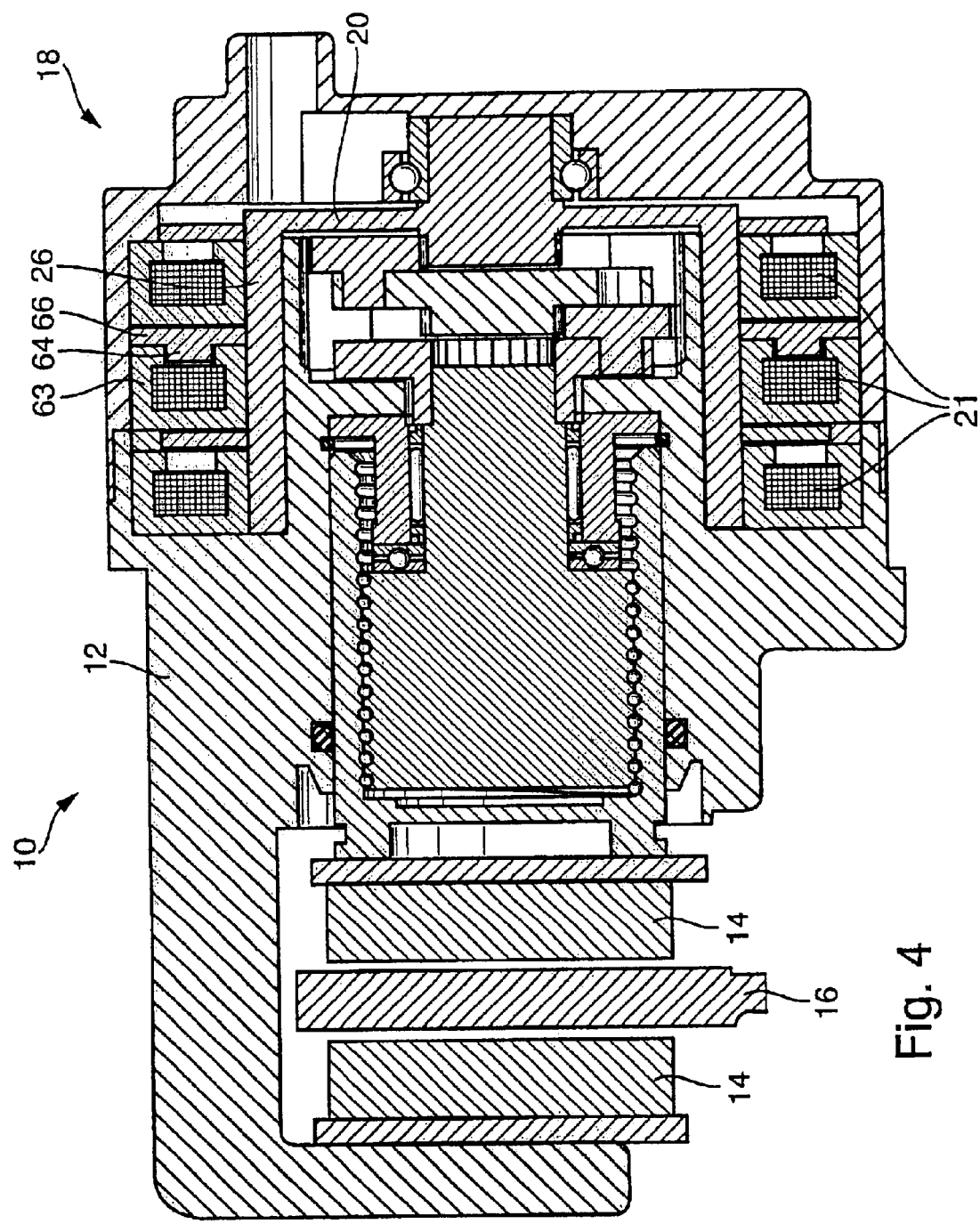
FIG. 4 shows another modified embodiment of the invention, with a disk armature transverse flux motor.

In the embodiment of the invention shown in FIG. 4, the wheel brake device 10 has a transverse flux motor 18 of the disk armature type. The design of the transverse flux motor 18 will be explained in conjunction with the depiction in FIG. 5. Here, too, each phase winding 21 of the transverse flux motor 18 has a circular excitation winding 22, which concentrically encompasses an imaginary motor axis. By contrast to FIGS. 1 and 3, the U-shaped yokes 24 are installed onto the excitation winding 22 laterally, i.e. with axially parallel legs 63. The rotor 20 has a pole ring 64, which is provided with a denticulation on the outside and inside that constitutes the poles 30. The poles 30 therefore protrude radially outward and inward from the pole ring 64. The pole ring 64 is disposed next to the excitation winding 22 in the axial direction, inside an opening of the U-shaped yokes 24 that are open toward the side. As described above in relation to FIG. 2, by supplying current to the excitation winding 22, the poles 30 are moved in the circumferential direction by magnetic force until they are aligned congruently with the yokes 24 so that repeated, successive supplying of current to the excitation windings 22 of the three phase windings 21 of the transverse flux motor 18 can set its rotor 20 into rotation. The pole ring 64 is attached to an annular disk 66, which is disposed in a radial plane and is non-rotatably affixed to an outside of the cylindrical circumference wall 26 of the rotor 20. The annular disk 66 is not shown in FIG. 5 because it would completely cover the excitation winding 22 and the pole ring 64 and would partially cover the yokes 24, which would make it impossible to see these parts.

Figure 6:
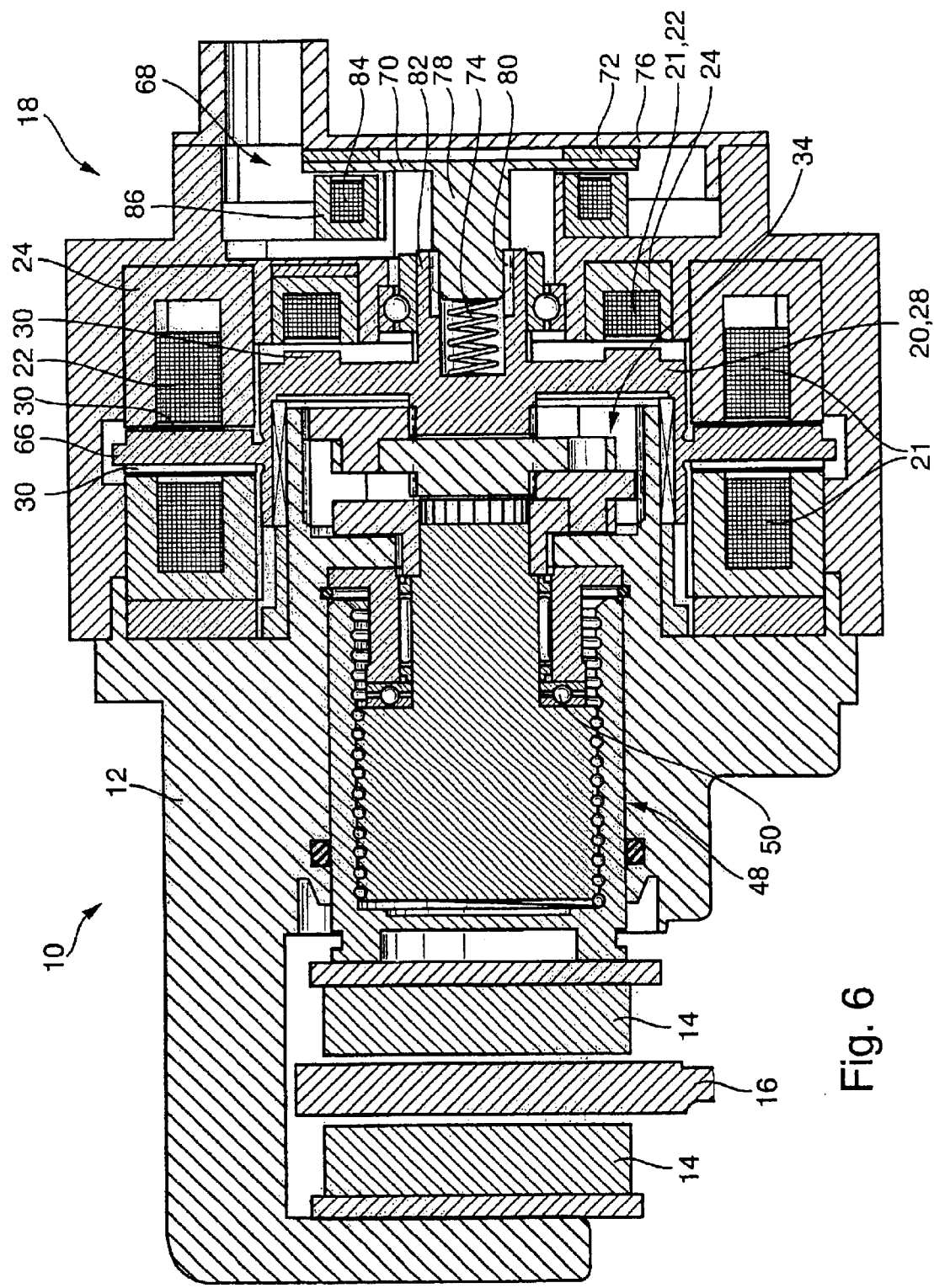
FIG. 6 shows another embodiment of the invention, with a disk armature transverse flux motor.

FIG. 6 shows a modified embodiment of wheel brake device 10 shown in FIG. 4, with a modified transverse flux motor 18, which is likewise of the disk armature type. In this embodiment of the invention, only two of the three phase windings 21 of the transverse flux motor 18 are disposed outside the cup-shaped rotor 20. The excitation windings 22 of these two phase windings 21 of the transverse flux motor 18 are disposed on both sides of the annular disk 66; the open sides of their U-shaped yokes 24 are oriented toward each other, i.e. pointing toward the annular disk 66. The annular disk 66 is provided with a denticulation on both sides and these denticulations constitute the poles 30 of the rotor 20. In order to produce the phase shift described above in conjunction with FIGS. 1 and 2, the yokes 30 of the two phase windings 21 are disposed offset from one another in the circumference direction by ⅓ the distance between the yokes 30 of a phase winding 21, which is why in FIG. 6, the yokes 30 on the right side of the annular disk 66 are shown in a sectional view and the yokes 30 on the left side of the annular disk 66 are shown in an aspect view.

The third phase winding 21 of the transverse flux motor 18 of the wheel brake device 10 shown in FIG. 6 is disposed inside one of the two other phase windings 21 on an outside, i.e. next to the end wall 28 of the rotor 20 in the axial direction. The end wall 28 is in turn provided with a denticulation, which constitutes the poles 30 of this third phase winding 21 of the transverse flux motor 18. The excitation winding 22 of this third phase winding 21 of the transverse flux motor 18 has a smaller diameter than the excitation windings 22 of both of the other phase windings 21; the excitation winding 22 of the third phase winding 21 likewise constitutes a circle, which is disposed concentric to an imaginary motor axis of the transverse flux motor 18. The excitation winding 22 of the third phase winding 21 also has U-shaped yokes 24 placed onto it, whose open ends are oriented toward the poles 30 of the third phase winding 21 of the transverse flux motor 18. The function of the transverse flux motor 18 of the embodiment of the wheel brake device 10 shown in FIG. 6 is the same as the one shown in FIG. 1. In FIG. 6, a more compact design of the transverse flux motor 18 has been chosen in which the excitation device 22, 24 of the third phase winding 21 is disposed inside the excitation device 22, 24 of one of the two other phase windings 21.

The rest of the design of the wheel brake device 10 shown in FIG. 6, with the two-stage planetary gear 34 disposed completely inside the rotor 20 of the transverse flux motor 18 and with the rotation/translation conversion gear 48 embodied as a ball screw 48, corresponds to the design of these parts in the wheel brake device 10 shown in FIG. 1.

In order to produce an auxiliary brake function, the wheel brake device 10 shown in FIG. 6 also has an auxiliary brake 68. The auxiliary brake 68 is embodied as an electromagnetic brake 68, which immobilizes the spindle 50 of a ball screw 48 when without current and can be released when it is supplied with current. The electromagnetic brake 68 has an armature plate 70, which is provided with a circular disk-shaped frictional brake lining 72, with which it is pressed against a housing cover 76 of the brake caliper 12 by a helical compression spring 74. In this manner, the armature plate 70 of the electromagnetic brake 68 is immobilized when without current. A pin 78 protrudes from the armature plate 70 and by means of a serrated connection 80, engages in a non-rotatable, axially mobile fashion in a sleeve 82, which protrudes from the end wall 28 of the rotor 20 and is of one piece with it. For releasing, the electromagnetic brake 68 has a coil 84, which is disposed in an annular yoke 86 that has a U-shaped cross section. If the coil 84 is supplied with current, then it attracts the armature disk 70 with magnetic force so that the armature disk 70 is lifted up from the housing cover 76, counter to the force of the helical compression spring 74, and can therefore rotate. Since the electromagnetic brake 68, when without current, holds the rotor 20 and, by means of the planetary gear 34, the spindle 50 of the ball screw 48 so that they cannot rotate, once a braking force of the wheel brake device 10 is produced by the transverse flux motor 18, this braking force is maintained even without a supply of current to the transverse flux motor 18, as a result of which the wheel brake device 10 can also be used as an auxiliary brake. The electromagnetic brake 68 can also be immobilized during a braking procedure if a braking force of the wheel brake device 10 produced by the transverse flux motor 18 must be kept constant, which means that the transverse flux motor 18 does not have to be supplied with current in order to keep the braking force constant. When the electromagnetic brake 68 is released, i.e. supplied with current, the transverse flux motor is only supplied with current in order to apply and increase the braking force and to completely release the wheel brake device 10. The ball screw 48 is selflocking-free so that a braking force of the wheel brake 10 produced by the transverse flux motor 18 automatically decreases to a low residual braking force.

The foregoing relates to preferred exemplary embodiments of the invention, it being understood that other variants and embodiments thereof are possible within the spirit and scope of the invention, the latter being defined by the appended claims.

We claim:

1. In an electromechanical wheel brake device, with an electric motor that has an annular rotor, with a rotation/translation conversion gear that can be driven to rotate by the electric motor, and with a frictional brake lining that can be pressed against a brake body by means of the rotation/translation conversion gear, wherein the electric motor (18) is a transverse flux motor (18) with an annular excitation winding (22) that encompasses an imaginary motor axis, the electric motor (18) having a number of yokes (24) distributed over the circumference of the excitation winding (22) and can be excited by this winding, and a number of poles (30) that preferably corresponds to the number of yokes (24), the poles (30) being guided so that they can move together in relation to the yokes (24), on a circular path in the circumference direction of the yokes (24) and, in order to generate a circular motion, can be magnetically attracted by the yokes (24) through excitation of the yokes (24).

2. The electromechanical wheel brake device according to claim 1, wherein yokes (24) are embodied as U-shaped and the excitation winding (22) is disposed inside the yokes (24).

3. The electromechanical wheel brake device according to claim 1, wherein the transverse flux motor (18) comprises three or more phase windings (21), and wherein each phase winding (21) includes an excitation winding (22), a number of yokes (24), and associated poles (30).

4. The electromechanical wheel brake device according to claim 1, wherein the transverse flux motor (18) has permanent magnets.

5. The electromechanical wheel brake device according to claim 1, wherein the wheel brake device (10) further comprises a reduction gear (34) connected between the electric motor (18) and the rotation/translation conversion gear (48).

6. The electromechanical wheel brake device according to claim 5, wherein the reduction gear (34) is disposed inside the rotor (20) of the electric motor (18) and wherein the rotation/translation conversion gear (48) is disposed at least partially inside the rotor (20) of the electric motor (18).

7. The electromechanical wheel brake device according to claim 1, wherein the rotation/translation conversion gear (48) is embodied as a ball screw (48).

8. The electromechanical wheel brake device according to claim 1, wherein the rotation/translation conversion gear (48) is selflocking-free.

9. The electromechanical wheel brake device according to claim 1, wherein the wheel brake device (10) further comprising an auxiliary brake (68) operable to immobilize the rotation/translation conversion gear (48).

10. The electromechanical wheel brake device according to claim 1, wherein the rotation/translation conversion gear (48) is embodied as a helical gear (48) and wherein a spindle (50) of the helical gear (48) is driven to rotate.

* * * * *